Dec. 19, 1933.  E. J. WITCHGER ET AL  1,940,475
MICROMETER GAUGE
Filed May 20, 1932
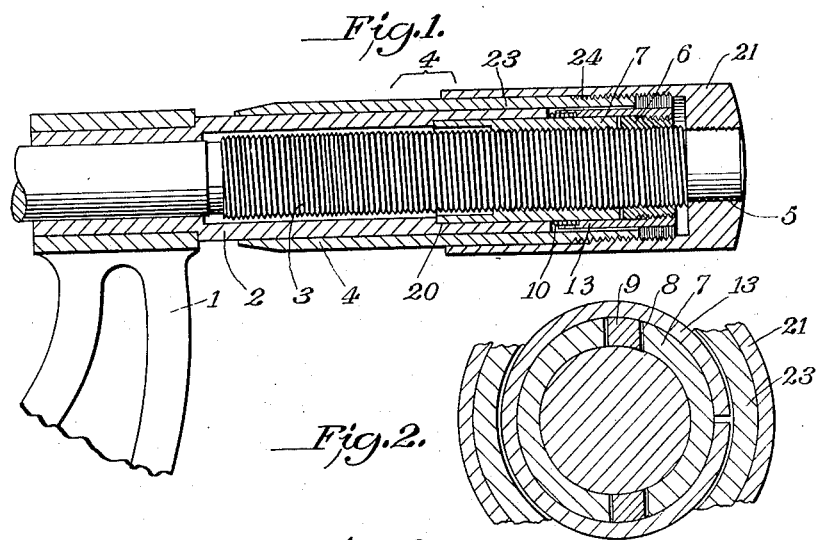
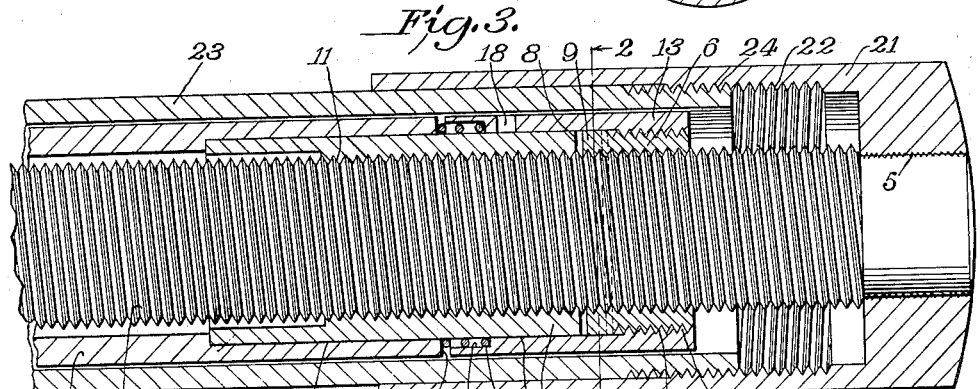
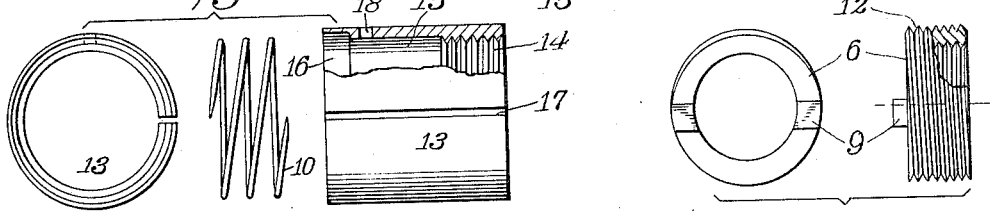
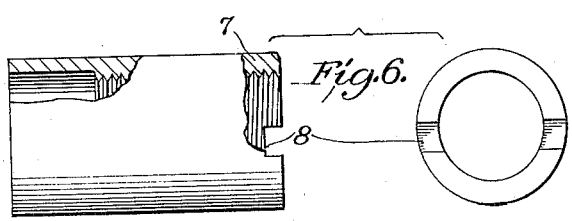
INVENTOR
EUGENE J. WITCHGER
OSCAR A. KOEBKE
BY George B. Willcox
ATTORNEY Patented Dec. 19, 1933

1,940,475

UNITED STATES PATENT OFFICE 1,940,475

MICROMETER GAUGE

Eugene J. Witchger and Oscar A. Koebke, Saginaw, Mich., assignors to Lufkin Rule Co., Saginaw, Mich., a corporation of Michigan Application May 20, 1932. Serial No. 612,516

5 Claims. (Cl. 33—164)

This invention relates to micrometer gauges of the class that employs an anvil-carrying yoke to which is secured a tubular barrel, a threaded micrometer spindle being screwed in the barrel and a wear-compensating nut screwed on the spindle adjacent the barrel.

Such a micrometer gauge, as constructed heretofore, will wear away at the working faces of the screw threads of the spindle and also at the co-operating faces of the terminal threads in the barrel, especially after the gauge has been used for a long time to measure work-pieces of approximately one size. A greater or less amount of end play of the spindle develops as wear continues, the result being unreliable performance of the instrument when taking fine measurements. Such unreliability is due principally to maladjustment of the vernier and uneven or unsatisfactory "feel" of the gauge.

An object of this invention is to eliminate end play by providing automatic compensation for wear at the screw threads as the wear occurs.

The improvement, therefore, is characterized by having means associated with the compensating nut to cause the nut to automatically take up wear. Moreover, these take-up devices function to continually exert an amount of yielding pressure against the working faces of the screw threads on the spindle appropriate to produce correct "feel" of the spindle-operating thimble or handle irrespective of the amount of wear on the threads. Adjustment of the "feel" can be made by these devices without disassembling the micrometer.

These advantages and certain others that will be set forth in the description are attained by a novel structure and arrangement of the compensating nut, an adjustable sleeve carried by the nut, and a spring element that co-operates with the sleeve, all of which are hereinafter described in detail, the several features of the invention being more particularly pointed out in the appended claims defining my invention. In the claims the essential elements are pointed out, it being understood, however, that the claims are not intended to be limited to the form of the parts illustrated and described further than a limitation to the described form is necessary to distinguish them from structures known in the prior art.

Fig. 1 of the accompanying drawing is a part longitudinal sectional view through the handle of the micrometer gauge involving our invention, the yoke and the measuring spindle being broken away.

Fig. 2 is an enlarged cross sectional view, broken away in part, taken on the line 2—2 of Fig. 3.

Fig. 3 is an enlarged view of the outer end of the handle shown in Fig. 1.

Fig. 4 is a detail, broken away, of the adjusting sleeve for the compensating nut and its co-operating compression spring.

Fig. 5 is a detail, partly broken away, of the compensating nut.

Fig. 6 is a similar detail of the threaded bushing that constitutes the end of the barrel in the preferred form.

This invention is illustrated as being applied to a micrometer gauge of the ordinary type consisting of a yoke or frame 1 upon one arm of which is an anvil (not shown), the other arm carrying the usual internally threaded tubular barrel, 2, into which the micrometer spindle 3 is screwed. Spindle 3 is rotated on the barrel by means of a thimble 4 that surrounds the barrel in telescoped relation. Thimble 4 is fixed to spindle 3 by soldering at 5, or otherwise.

A compensating nut 6 is threaded on spindle 3 adjacent a separable, internally threaded end portion 7 of barrel 2, which is, in effect, a reduced end portion of the barrel. Nut 6 is interlocked with the end 7 of the barrel in such a way that it can not be rotated, but is capable of endwise movement relative to the barrel. The interlocking arrangement is preferably of the nature of a jaw clutch arranged so that its elements can be engaged only when the threads of the nut and of the barrel are positioned for helical continuity. With this arrangement it is impossible to inadvertently assemble the barrel and the spindle and the compensating nut in any way except in proper working relationship. In the form illustrated this clutch consists of a pair of notches, 8, in the ends of the barrel and a pair of cooperating lugs, 9, that project from the end of nut 6 and are adapted to be received in the notches 8 when the nut and barrel are assembled, as shown in Fig. 2 and Fig. 3. In the form shown these clutch elements are offset with respect to the diametrical line of the barrel so that they can be assembled in one position only, that is, when the threads 7 of the barrel and the threads of nut 6 are in helical continuity, permitting the spindle to be screwed through both the barrel and the compensating nut as if these two parts were integral and were provided with a single continuous screw thread. A yieldable compression spring 10 or its equivalent is used to urge the nut 6 longitudinally away from the end 7 of the barrel to the right in Fig. 1, and so keeps the threaded end of the spindle normally urged lengthwise away from the yoke. During the taking of a measurement the working faces of the screw threads on the spindle 3 and of the threads on the end portion 7 of the barrel are kept normally in yielding contact with each other at 11 and endwise play of the spindle toward the right, Figs. 1 and 3, is prevented. A preferred arrangement of spring 10 is shown in Fig. 3, which also shows means whereby the amount of its compression can be varied to adjust the sensitiveness or "feel" of the instrument during the taking of measurements.

Nut 6 is externally threaded at 12. A sleeve 13, internally threaded at one end, 14, is screwed on the nut for endwise adjustment with respect to the nut. A threadless portion 15 of sleeve 13 telescopes with and surrounds the reduced end portion 7 of the barrel 2. Extension 15 of sleeve 13 is formed at its end to present a counterbore 16. Spring 10 is received in the counterbore 16 and so is enclosed in an annular chamber. It is prevented from coming into contact with threaded spindle 3, likewise is kept from contact with the inner wall of the tubular thimble 4 that surrounds the barrel. Spindle 3 and thimble 4 are thus assured of free rotation and spring 10 is not subjected to wear, neither can it introduce any frictional action that might interfere with the "feel" of the instrument. Sleeve 13 is preferably formed with a longitudinal slit, as shown at 17 in Fig. 4, to keep it from binding around the nut 6. A hole 18 to receive a small spanner wrench is provided in the sleeve to effect its longitudinal adjustment and to regulate the compression of spring 10.

Spring 10, received in the counterbore of the sleeve, has its end seated upon an annular shoulder or abutment 19 on barrel 2.

The threaded end portion 7 of barrel 2 may be renewed easily if damaged, being press-fitted into a counterbore 20 of the barrel.

For the purposes of our invention as claimed it is immaterial whether the barrel 2 is made in two parts, 2, 7 shown in Fig. 3 or in one piece.

Thimble 4 may be made in two parts, as is shown in Fig. 3, one part being in tubular cap member 21 which is internally threaded at 22, the other part being tubular portion 23 externally threaded at 24 and screwed into the cap member 21. The described details 21, 23 of the thimble structure are also optional, but in practice these structures are considered preferable.

An advantage of the structure herein shown and described is that all necessary adjustments for compensation of wear and the adjustments for "feel" can be made without requiring the operator to use more than ordinary care, and without disassembling the instrument. With this adjustable arrangement the parts can not be assembled in any way except the right one. In these respects the present invention differs materially from those previous devices in which extreme care must be taken during the operation of adjusting, to turn a threaded adjusting element through only a minute fraction of a revolution and keep it in that position while the spindle was being screwed through the barrel and through the nut.

After considerable wear on the threads has been taken up by the compression spring in the manner described a certain play of the spindle will be sensed when the spindle is pushed in toward the yoke against compression of the spring.

Some users of micrometer gauges prefer that there shall be no possibility for end play in the spindle. To meet that requirement sleeve 13 is screwed along nut 6 until its end portion 16 meets abutment 19 and thrusts the spindle to the right, Fig. 3, urging working faces of the spindle threads against the threads of the barrel, as at 11, sufficiently to give the desired "feel". When sleeve 13 is against abutment 19 there is no possibility of end play of the spindle in either direction.

Thus the operator has two alternative ways to compensate for wear and adjust the "feel". Spring 10 can be utilized in the manner first described herein, or else sleeve 13 can be brought into actual contact with abutment 19. In either case wear is compensated for. Using spring 10, further wear is automatically corrected but a small amount of back lash is sensed if the spindle is pushed toward the yoke. If the sleeve is screwed into contact with abutment 19 no back lash will be present and in case he prefers not to use spring 10 subsequent wear can be taken up by periodic adjustment. In all cases, however, the "feel" is controlled by adjusting sleeve 13 in relation to nut 6 and abutment 19 as distinguished from former practice wherein the "feel" had to be regulated by turning the nut in relation to the barrel, which had the undesirable effect of distorting the helical continuity of the thread.

Having thus described our invention, what we claim and desire to secure by Letters Patent is:

1. A micrometer gauge having in combination, a tubular internally threaded barrel with an end portion of reduced external diameter presenting an abutment, a threaded micrometer spindle adapted to be screwed into said barrel, thimble means adapted to rotate the spindle for effecting micrometric measurements, a compensating nut adapted to be threaded on said spindle, interlocking elements operatively connecting said barrel and said nut and arranged so that the elements are in mutually non-rotatable relation but are capable of relative movement endwise, said interlocking elements being mounted on the barrel and spindle so that they can be interlocked only when the threads of the nut and of the barrel are in helical continuity, a longitudinally slitted adjusting sleeve surrounding said nut in threaded engagement therewith, a portion of said sleeve surrounding an end of said barrel and formed with a counterbore, and a helical compression spring received in said counterbore and seated upon the abutment of said barrel, whereby the working faces of the threads of the spindle are kept yieldingly pressed against co-operating faces of the threads of said barrel, the arrangement being such that rotation of said adjusting sleeve causes variable degrees of compression of said spring and thereby adjusts the feel of said micrometer gauge during the taking of measurements.

2. A micrometer gauge having, in combination, a tubular internally threaded barrel, a threaded micrometer spindle adapted to be screwed into said barrel, a compensating nut adapted to be threaded on said spindle, interlocking elements operatively connecting said barrel and said nut and arranged so that the elements are in mutually non-rotatable relation but are capable of relative movement endwise, said interlocking elements being mounted on the barrel and spindle so that they can be interlocked only when the threads of the nut and of the barrel are in helical continuity, and a yieldable compression spring operative between the nut and barrel, whereby the working faces of the threads of the nut are kept yieldingly pressed against cooperating faces of the threads of said barrel.

3. In a micrometer gauge including a threaded spindle, a non-rotatable compensating nut on said spindle, a tubular sleeve mounted on said nut and adjustable lengthwise thereof, an abutment member on said gauge opposed to said sleeve and a yieldable spring member operatively interposed between said abutment and said sleeve.

4. A structure as set forth in claim 3 wherein the tubular sleeve is provided with an internal thread screwed on said nut and is formed with a counterbore within which said spring is enclosed.

5. A micrometer gauge having in combination a barrel, a screw threaded therein, and a nut on the screw adjacent the barrel, elements operatively connecting the barrel and nut, said elements being arranged for relative endwise movement and for interlocked engagement against relative rotation, and a sleeve surrounding said nut and longitudinally adjustable thereon and an abutment on the barrel positioned to be engaged by said sleeve, the sleeve and abutment constituting means whereby to adjust for endwise looseness in the threads by forcing apart the said nut and barrel.

EUGENE J. WITCHGER.
OSCAR A. KOEBKE.